United States Patent
Mochida

(10) Patent No.: US 8,690,440 B2
(45) Date of Patent: Apr. 8, 2014

(54) IRON-BASED METAL BEARING CAP TO BE CAST INTO LIGHT METAL MEMBER

(75) Inventor: Hiroaki Mochida, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/820,947

(22) PCT Filed: Aug. 4, 2011

(86) PCT No.: PCT/JP2011/067872
§ 371 (c)(1),
(2), (4) Date: Mar. 5, 2013

(87) PCT Pub. No.: WO2012/032888
PCT Pub. Date: Mar. 15, 2012

(65) Prior Publication Data
US 2013/0170774 A1   Jul. 4, 2013

(30) Foreign Application Priority Data

Sep. 6, 2010 (JP) .................................. 2010-199119

(51) Int. Cl.
*F16C 35/00* (2006.01)
(52) U.S. Cl.
USPC .......................................................... 384/432
(58) Field of Classification Search
USPC .............. 384/429, 430, 432–434; 123/195 R
See application file for complete search history.

(56) References Cited

U.S. PATENT DOCUMENTS

| | | | |
|---|---|---|---|
| 1,764,672 A * | 6/1930 | Herbert | 384/432 |
| 2,997,347 A * | 8/1961 | Bauer | 384/432 |
| 3,304,134 A * | 2/1967 | Allen | 384/432 |
| 4,693,216 A | 9/1987 | Ampferer et al. | |
| 5,133,313 A * | 7/1992 | Inoue et al. | 123/195 C |
| 5,203,854 A * | 4/1993 | Nilsson et al. | 384/433 |
| 6,357,412 B1 | 3/2002 | Menzl | |
| 6,666,582 B2 * | 12/2003 | Benini et al. | 384/433 |
| 7,695,823 B2 * | 4/2010 | Wakade | 428/548 |
| 8,210,749 B2 * | 7/2012 | Mandel et al. | 384/434 |

FOREIGN PATENT DOCUMENTS

| | | |
|---|---|---|
| JP | 61-45108 A | 3/1986 |
| JP | 4-68215 U | 6/1992 |
| JP | 2002-517659 A | 6/2002 |

* cited by examiner

*Primary Examiner* — Phillip A Johnson
(74) *Attorney, Agent, or Firm* — Foley & Lardner LLP

(57) ABSTRACT

An iron-based metal bearing cap according to the present invention to be cast as a core into a light metal member includes an arcuate portion which forms a bearing surface, left and right flange portions which are arranged and connected to opposite ends of the arcuate portion, and boss portions which are arranged to stand on the rear surfaces of the left and right flange portions and through which mounting bolts are inserted. The bosses are formed with grooves or projections.

4 Claims, 8 Drawing Sheets

IRON-BASED METAL BEARING CAP TO BE CAST INTO LIGHT METAL MEMBER

FIELD OF THE INVENTION

The present invention relates to a bearing cap for rotatably supporting a crankshaft journal of an internal combustion engine and particularly to a bearing cap to be cast as a core into a light metal member.

BACKGROUND

An iron-based metal bearing cap to be cast as a core into a light metal member such as a bearing cover has been conventionally proposed as disclosed in JPS61-45108A.

The bearing cap to be cast as a core is formed by a pair of bosses each including a bolt hole for fixing and a transverse member which forms a bearing surface between the bosses to connect between the bosses and includes recesses on opposite side surfaces. By integrally casting this bearing cap as a core into the light metal member such as a bearing cover, the material of the bearing cover can enter the recesses of the core and the two members can be satisfactorily bonded.

SUMMARY

However, since the light metal member having entered the recesses of the bearing cap expands more than the bearing cap formed of an iron-based member at an operating temperature of an internal combustion engine in the above conventional example, the bearing surface of the bearing cap may be deformed.

The present invention was developed in view of such a problem and an object thereof is to provide an iron-based metal bearing cap to be cast into a light metal member which bearing cap reduces the deformation of a hearing surface and is suitable for improving bonding to a light metal member.

To achieve the above object, the present invention is directed to an iron-based metal bearing cap to be cast as a core into a light metal member, including an arcuate portion which forms a bearing surface, left and right flange portions which are arranged and connected to opposite ends of the arcuate portion, and boss portions which are arranged to stand on the rear surfaces of the left and right flange portions and through which mounting bolts are inserted, wherein the bosses are formed with grooves or projections.

An embodiment and advantages of the present invention are described in detail below with reference to the accompanying drawing.

DETAILED DESCRIPTION

Hereinafter, an iron-based metal bearing cap of the present invention to be cast into a light metal member is described based on one embodiment shown in FIGS. 1 to 6.

Figure 1:
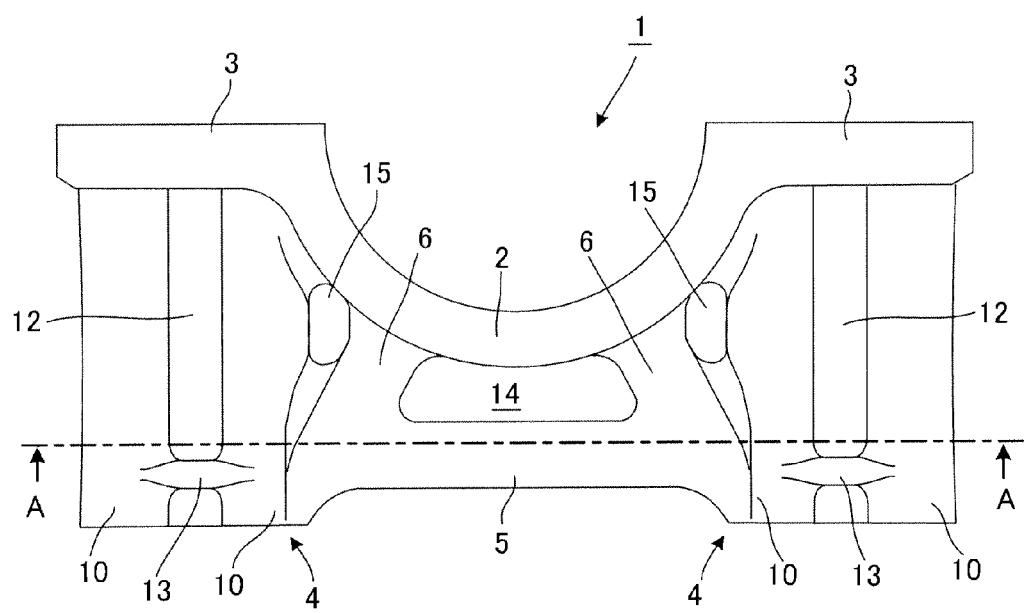
FIG. 1 is a schematic configuration diagram of an iron-based metal bearing cap to be cast into a light metal member showing one embodiment of the present invention.
Figure 3:
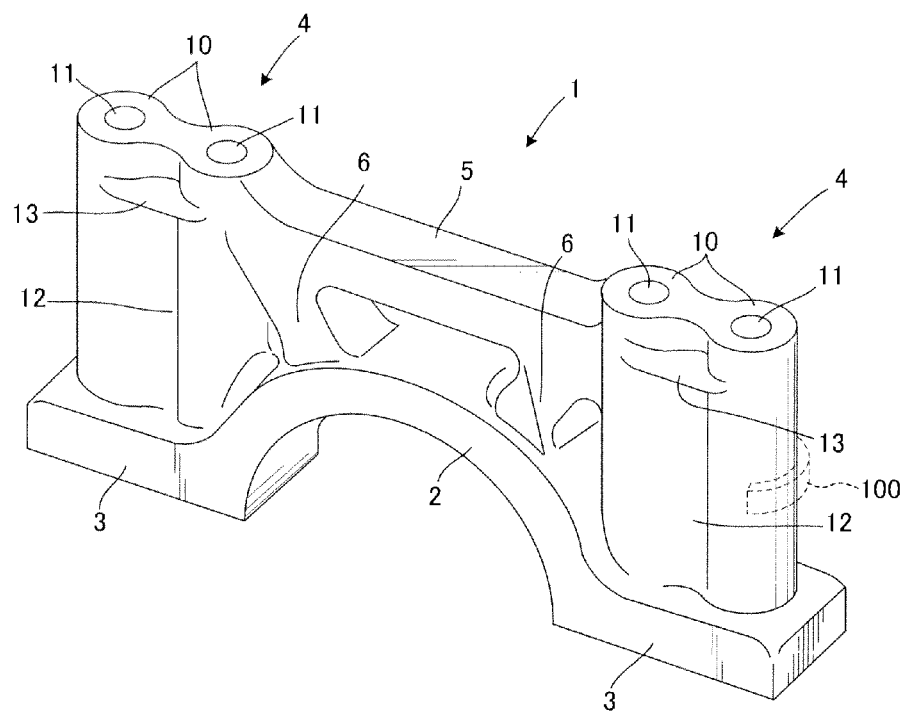
FIG. 3 is a perspective view of the bearing cap.

In FIGS. 1 and 3, the iron-based metal bearing cap 1 to be cast into the light metal member is made of iron-based metal. The bearing cap 1 includes an arcuate portion 2 which forms a bearing surface, flange portions 3 which are connected to opposite ends of the arcuate portion 2 and extend toward opposite sides, and boss portions 4 which are arranged to stand on the rear surfaces of the respective flange portions 3 and through which mounting bolts are to be inserted. Further, the bearing cap 1 integrally includes a coupling beam 5 which is arranged at a distance away from the rear surface of the arcuate portion 2 and couples leading end sides of the both boss portions 4, and a pair of reinforcing beams 6 which couple respective coupled parts of the coupling beam 5 and the boss portion 4 to the rear surface of the arcuate portion 2.

The arcuate portion 2 forming the bearing surface and the flange portions 3 connected to the opposite ends of the arcuate portion 2 and extending toward the opposite sides have a rectangular cross-section having the same width and thickness. The bearing surface for supporting a crank journal via an unillustrated bearing metal is formed on an arcuate surface of the arcuate portion 2. Further, the upper surfaces of the flange portions 3 connected to the opposite ends of the arcuate portion 2 and extending toward the opposite sides are formed to be flat and brought into contact with the lower end surface of a bulkhead of a cylinder block.

Figure 2:
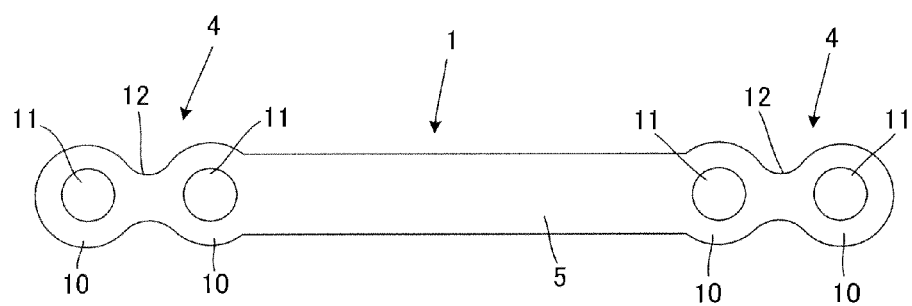
FIG. 2 is a sectional view along II-II line of FIG. 1.

The boss portion 4 which is arranged to stand on the rear surface of each of the both flange portions 3 and through which the mounting bolts are to be inserted includes two bolt holes 11 penetrating through the flange portion 3 and two bosses 10 surrounding these bolt holes 11. As shown in FIG. 2, the two bolt holes 11 are spaced apart and the two bosses 10 surrounding these bolt holes 11 are also spaced apart, whereby grooves 12 having a depth comparable to the thickness of the bosses 10 are formed between the two bosses 10. The bosses 10 are coupled by ribs 13 arranged to cross the grooves 12 between the bosses 10 at a leading end side. Specifically, the bosses 10 are coupled by a thin portion where the grooves 12 are formed and coupled to each other by the flange portion 3 at a base end side and the ribs 13 at the leading end side, thereby enhancing the stiffness thereof. Thus, the grooves 12 between the bosses 10 are formed into basin-shaped spaces (closed spaces) with the opposite ends thereof closed by the ribs 13 and the rear surface of the flange portion 3.

The coupling beam 5 is arranged at a distance away from the rear surface of the arcuate portion 2 and couples the leading end sides of the both boss portions 4. The coupling beam 5 is coupled to the boss portions 4 at positions where the ribs 13 coupling the bosses 10 of the boss portions 4 at the leading end side are arranged, and the ribs 13 and the coupling beam 5 are arranged substantially on the same straight line.

Since the pair of boss portions 4 support each other by being coupled to each other by the coupling beam 5 at the positions where the ribs 13 are arranged at the leading end side, the boss portions 4 can be made stiffer and lighter in weight. Specifically, the boss portions 4 are coupled to each other by the flange portions 3 and the arcuate portion 2 at the base end side and by the coupling beam 5 at the leading end side, thereby forming a strong frame shape and improving the stiffness thereof. Specifically, the bearing cap 1 can enhance stiffness in a lateral bending direction in which surfaces including the flange portions 3, the arcuate portion 2, the boss portions 4 and the coupling beam 5 are bent, vertical flexural stiffness in these surfaces and torsional stiffness against forces twisting these surfaces.

The pair of reinforcing beams 6 couple the respective coupling parts of the coupling beam 5 and the boss portions 4 to the rear surface of the arcuate portion 2 in diagonal directions. This can further improve the stiffness in the surfaces including the boss portions 4, the coupling beam 5, the flange portions 3 and the arcuate portion 2.

A penetration space 14, the opposite sides of which are enclosed by the reinforcing beams 6 is formed between the coupling beam 5 and the arcuate portion 2 and penetration spaces 15 partly abutting on the rear surface of the arcuate portion 2 are formed between the both reinforcing beams 6 and the boss portions 4.

Figure 4:
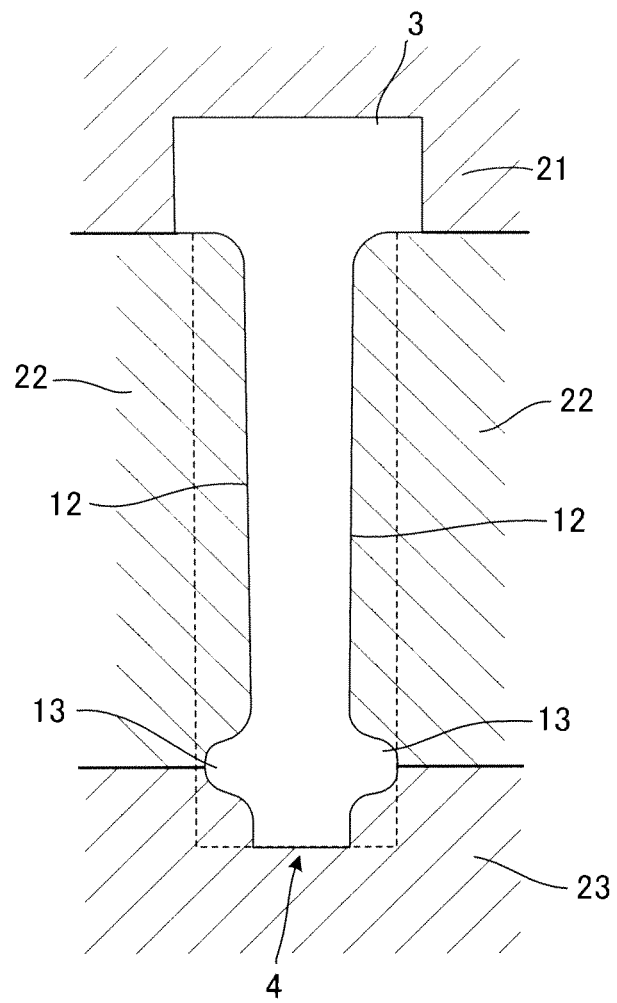
FIG. 4 is a diagram showing a casting die for a boss portion of the bearing cap.
Figure 5:
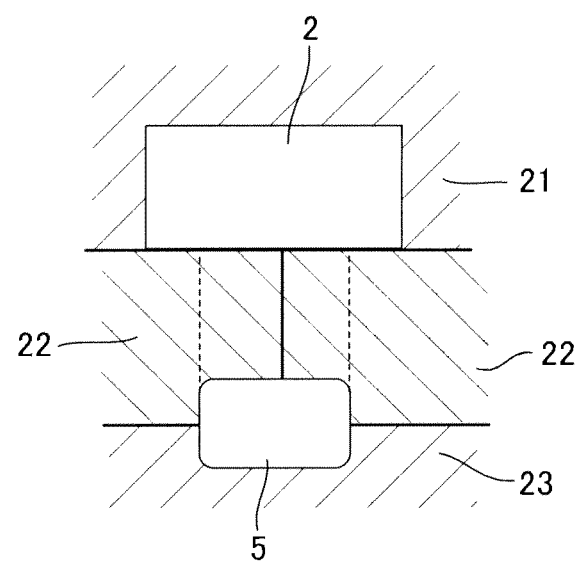
FIG. 5 is a diagram showing a casting die for a central portion of the bearing cap.

The bearing cap 1 configured as described above is formed by casting using a forming die shown in FIGS. 4 and 5. FIG. 4 is a diagram showing a casting die for the boss portion 4 of the bearing cap 1 and FIG. 5 is a diagram showing a casting die for a central portion of the bearing cap 1. The molding die is formed of an upper die 21 with a cavity engraved in conformity with the shapes of the arcuate portion 2 and the flange portions 3, side dies 22 having a side surface shape from the ribs 13 of the boss portion 4 and the center of the coupling beam 5 to the flange portion 3 and the arcuate portion 2, and a lower die 23 with a cavity in conformity with the shape of a side below the ribs 13 of the boss portions 4 and the center of the coupling beam 5. Burrs are formed on parts of the cast bearing cap 1 where surfaces of the side die 22, the lower side 23 and the upper die 21 are matched, but these burrs are located on a central part of the coupling beam 5, top parts of the ribs 13 and the edges of the arcuate portion 2 and the flange portions 3 and can easily be removed.

Figure 6:
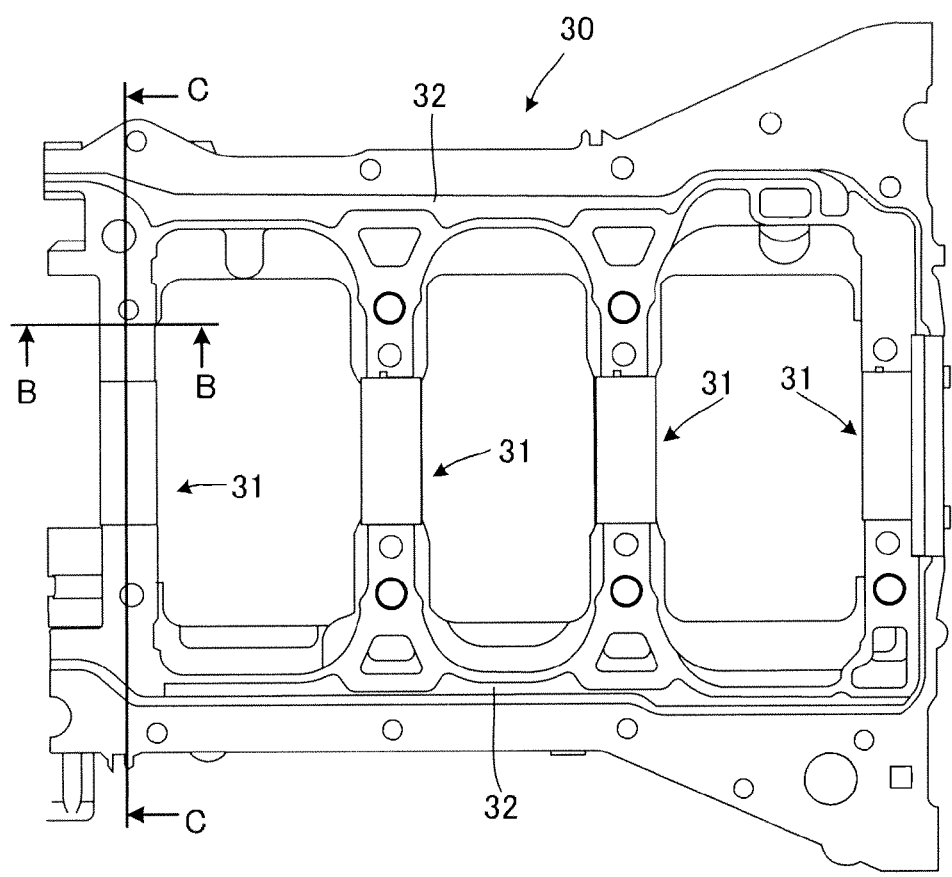
FIG. 6 is a plan view of a ladder frame in which bearing caps are cast.

The bearing cap 1 configured as described above is integrally cast into a ladder frame 30 made of light metal as shown in FIG. 6. Specifically, FIG. 6 shows the ladder frame 30 in a V-type six-cylinder engine and the ladder frame 30 includes four bearing cap portions 31 each including the built-in bearing cap 1 cast inside, and coupling portions 32 coupling opposite end surfaces of these bearing cap portions 31 to form a case.

Figure 7:
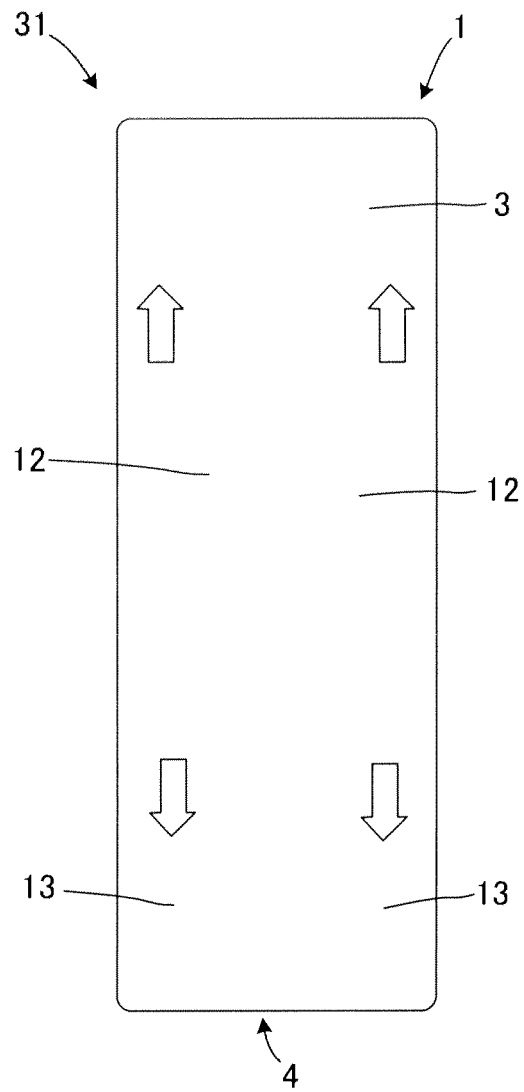
FIG. 7 is a sectional view along VII-VII line of FIG. 6.
Figure 8:
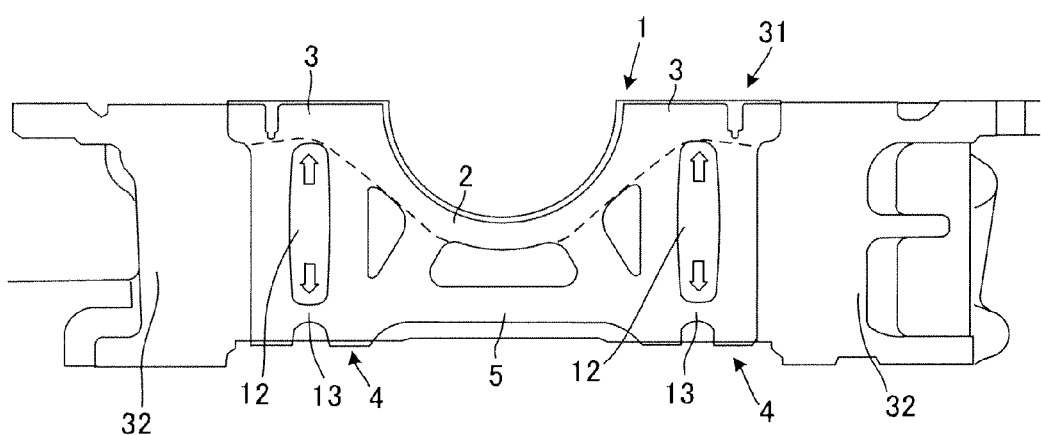
FIG. 8 is a sectional view along VIII-VIII line of FIG. 6.

In the bearing cap 1 cast into the bearing cap portion 31, the boss portions 4, the coupling beam 5 and the reinforcing beams 6 in a lower area excluding the arcuate portion 2 and the flange portions 3 are surrounded by a light metal material as shown in FIGS. 7 and 8. Thus, the light metal material penetrates from one side to the other side of the bearing cap 1 to fill the penetration space 14 enclosed by the reinforcing beams 6 and the penetration spaces 15 between the both reinforcing beams 6 and the boss portions 4. Further, the boss portions 4 are also surrounded by the light metal material and only end parts of the bosses thereof are exposed from the light metal material. Thus, the light metal material is also filled in the grooves 12 located between the bosses 10 and formed into the basin-shaped spaces (closed spaces) with the opposite ends closed by the ribs 13 and the rear surfaces of the flange portions 3.

Normally, the bearing cap 1 is held by a contractile force generated by the cooling of the light metal material after the casting of the ladder frame 30. However, the contractile force to reduce a holding force decreases due to a difference between the amount of expansion of the light metal material and that of the bearing cap 1 made of iron-based metal caused by a temperature increase associated with the engine operation during an actual operation.

In this embodiment, the expansion of the light metal material filled in the grooves 12 located between the bosses 10 and formed into the basin-shaped spaces (closed spaces) with the opposite ends closed by the ribs 13 and the rear surfaces of the flange portions 3 due to a temperature increase during the actual operation is restricted by the ribs 13 and the flange portions 3. Thus, a contact pressure between the ribs 13 and the rear surfaces of the flange portions 3 is increased according to the expansion of the light metal material filled in the grooves 12. This can suppress a reduction in the holding force between the light metal material of the bearing cap portion 31 and the bearing cap 1 formed of the iron-based metal.

Further, even if the light metal material filled in the grooves 12 expands, the boss portions 4 formed with the grooves 12 are distant from the arcuate portion 2 formed with the bearing surface. Thus, the deformation of the bearing surface is reduced. Furthermore, since the thermal expansion of the boss portions 4 formed with the grooves 12 is suppressed by the mounting bolts, a thermal expansion difference from the light metal material increases to enhance bonding between the bearing cap 1 and the light metal member.

This embodiment can achieve the following effects.

The iron-based metal bearing cap 1 is cast as a core into the light metal member. Specifically, the bearing cap 1 includes the arcuate portion 2 which forms the bearing surface, the left and right flange portions 3 which are arranged and connected to the opposite ends of the arcuate portion 2, the pair of boss portions 4 which are arranged to stand on the rear surfaces of the left and right flange portions 3 and through which the mounting bolts are to be inserted. The boss portions 4 are formed with the grooves 12.

Accordingly, by casting the bearing cap 1 into the light metal member, the light metal material is filled into the grooves 12 formed on the boss portions 4. Since the expansion of the light metal material filled in the grooves 12 due to a temperature increase during an actual operation is restricted by the grooves 12, a reduction in the holding force between the light metal material and the bearing cap 1 formed of the iron-based material can be suppressed. As a result, bonding to the light metal member can be improved. Further, since the thermal expansion of the boss portions 4 formed with the grooves 12 is suppressed by the mounting bolts, the thermal expansion difference from the light metal member increases to enhance bonding between the bearing cap 1 and the light metal member.

The boss portion 4 includes the two bolt holes 11 penetrating through the flange portion 3 and the two bosses 10 surrounding these bolt holes 11, and the grooves 12 are formed between the both bosses. Further, the bosses are coupled to each other by the ribs 13 arranged to cross the grooves between the bosses at the leading end side.

Accordingly, by casting the bearing cap 1 into the light metal member, the light metal material is also filled into the grooves 12 located between the bosses 10 and formed into the basin-shaped spaces (closed spaces) with the opposite ends closed by the ribs 13 and the rear surfaces of the flange portions 3. The expansion of the light metal material filled in the grooves 12 located between the bosses 10 and formed into the basin-shaped spaces (closed spaces) with the opposite ends closed by the ribs 13 and the rear surfaces of the flange portions 3 due to a temperature increase during an actual operation is restricted by the ribs 13 and the flange portions 3. Thus, a reduction in the holding force between the light metal material and the bearing cap 1 formed of the iron-based material can be suppressed by increasing the contact pressure between the ribs 13 and the rear surfaces of the flange portions 3 according to the expansion of the light metal material filled in the grooves 12. As a result, bonding to the light metal member can be improved without reducing the stiffness of the bearing cap 1.

Since the pair of boss portions 4 are coupled to each other by the coupling beam 5 at the positions where the ribs 13 are arranged, the boss portions 4 support each other and can be made stiffer and lighter in weight.

Since the pair of boss portions 4 include the pair of reinforcing beams 6 coupling the respective parts of the boss portions 4 coupled to the coupling beam 5 to the rear surface of the arcuate portion 2 in the diagonal directions, joint stiffness between the boss portions 4 and the arcuate portion 2 is further improved.

Since the bearing cap 1 is cast and molded by the casting dies that are matched at sites where the ribs 13 and the coupling beam 5 are present, burrs formed on the die matching surfaces can be located on the central part of the coupling beam 5 and the top parts of the ribs 13 and can easily be removed.

Although the specific embodiment of this invention has been described above, this invention is not limited to the above embodiment. It is possible for a person skilled in the art to modify or alter the above embodiment in various manners within the technical scope of the present invention.

For example, in the above embodiment, bonding between the bearing cap and the light metal member is improved by forming the grooves on the boss portions of the bearing cap and fitting the light metal material into the grooves. However, similar effects may be obtained by forming projections 100 (broken-line portion of FIG. 3) on the boss portions and forming projections and recesses between the bearing cap and the light metal material.

The present application claims a priority based on Japanese Patent Application No. 2010-199119 filed with the Japan Patent Office on Sep. 6, 2010, all the contents of which are hereby incorporated by reference.

The invention claimed is:

1. An iron-based metal bearing cap to be cast as a core into a light metal member, comprising:
    an arcuate portion which forms a bearing surface;
    left and right flange portions which are arranged and connected to opposite ends of the arcuate portion; and
    boss portions which are arranged to stand on the rear surfaces of the left and right flange portions and through which mounting bolts are inserted;
    wherein:
        each one of the boss portions is formed with a groove;
        each one of the boss portions includes two bolt holes penetrating through each one of the flange portions and two bosses surrounding the two bolt holes;
        the groove is formed between the two bosses; and
        the two bosses are coupled to each other by a rib arranged to cross the groove between the bosses at a leading end side.

2. The iron-based metal bearing cap to be cast into the light metal member according to claim 1, wherein:
    the boss portions are coupled to each other by a coupling beam at a position where the rib is arranged.

3. The iron-based metal bearing cap to be cast into the light metal member according to claim 2, wherein:
    the boss portions include a pair of reinforcing beams which couple respective parts of the boss portions coupled to the coupling beam to the rear surface of the arcuate portion in diagonal directions.

4. The iron-based metal bearing cap to be cast into the light metal member according to claim 2, wherein:
    the bearing cap is cast and molded by casting dies which are matched at sites where the rib and the coupling beam are present.

* * * * *